Aug. 26, 1947.    R. L. ACRES    2,426,332
CONDUIT COUPLING
Filed Feb. 19, 1944

INVENTOR.
RICHARD L. ACRES.
BY J. Vincent Martin
and
Ralph K. Browning
ATTORNEYS Patented Aug. 26, 1947

2,426,332

UNITED STATES PATENT OFFICE 2,426,332

CONDUIT COUPLING

Richard L. Acres, Houston, Tex., assignor to William F. Curlee, Houston, Tex.

Application February 19, 1944, Serial No. 523,013

3 Claims. (Cl. 285—146)

This application relates in general to couplings or connectors for spirally wound flexible conduits. Such conduits may be formed of a strip of metal or other suitable material and are provided with inwardly and outwardly turned edges so that when spirally wound these edges will interlock and provide a lost motion edge-to-edge connection for the convolutions of the strip forming the conduit, thereby forming a flexible continuous conduit.

Various types of connectors have heretofore been provided for attachment to the end of spirally wound conduits such as just referred to so that the ends of such conduits might be secured to various fittings such as outlet boxes, switch boxes and the like. In the past however, such connectors or couplings have been of such a nature that they either distorted the conduit in such a manner as to cause adjacent convolutions of the conduit to become disengaged and the conduit thus opened exposing the electric wires or other parts contained therein, or they have been somewhat complicated in their structure and expensive to manufacture.

Furthermore, certain types of couplings have been devised which engage the interior of a conduit, having threads adapted to fit into the grooves between the adjacent convolutions of the conduit and other portions for locking the coupling in engaged position within the conduit. However, conduits of this general type are made by numerous manufacturers, and the pitch of the spirally wound ribbon or strip varies considerably between the various manufacturers, as does also the interior diameter of various conduits which are nominally of the same diameter.

It is an object of this invention to provide a coupling for a flexible conduit of the spirally wound type, which coupling will be very simple and relatively inexpensive to manufacture but which will lock itself firmly within the end of a flexible spirally wound conduit without the necessity for any tools for putting it in place.

Another object of this invention is to provide such a coupling which will adapt itself to various conduits of the same nominal diameter but of different pitches in their respective spiral windings.

Another object of this invention is to provide such a structure which may be employed in conduits of various actual internal diameters within reasonable limits so that it may be used interchangeably for conduits having the same nominal diameters but different actual internal diameters.

Other objects and advantages of this invention will become apparent from the following description taken in connection with the accompanying drawing wherein are illustrated by way of example two embodiments of the invention.

Figure 2:
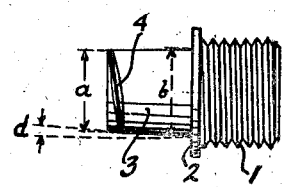
Fig. 2 is an end elevation of the same coupling.
Figure 1:
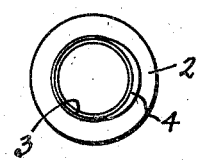
Fig. 1 is a side elevation of a coupling constructed in accordance with this invention.

Referring now more in detail to the drawing, the coupling is illustrated as having a threaded end 1 with a radially extending flange 2 at the inner end thereof, the threads 1 being adapted to receive a nut or the like for the purpose of clamping the coupling within an opening in an outlet box or a switch box.

Extending from the opposite side of the flange 2 is a tapered shank portion 3 of somewhat reduced diameter having a projection 4 thereon consisting of a fractional convolution of a thread.

Figure 3:
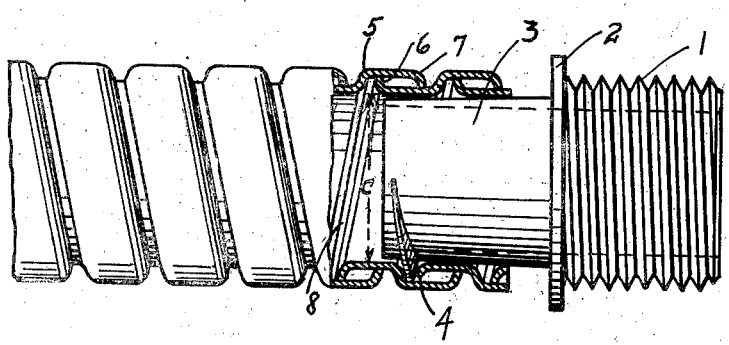
Fig. 3 is a view on an enlarged scale showing the coupling illustrated in Figs. 1 and 2, with this coupling partially inserted within the end of a flexible conduit, portions of the conduit being broken away and shown in section for the purpose of illustration.
Figure 4:
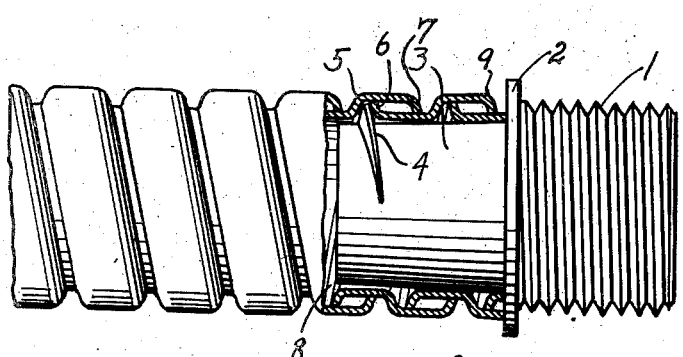
Fig. 4 is a view similar to Fig. 3 but showing the coupling after it has been fully engaged within the flexible conduit.

The coupling just described is adapted to be received into the end of a flexible spirally wound conduit such as illustrated in Figs. 3 and 4. Such conduits are formed by a spiral winding of a metallic or other strip or ribbon 5, such strip having one portion with an outwardly turned edge 6 and its opposite portion with an inwardly turned edge 7 adapted to fit over and interlock with the outwardly turned edge 6 of the next convolution. It will be seen that a conduit formed in this manner will have a spiral groove not only on its exterior surface but also on its interior surface as illustrated at 8.

As hereinbefore stated, use has previously been made of the spiral groove 8 for the purpose of receiving a thread on a tubular part carried by a coupling so that the coupling might be screwed into the end of the conduit. In those instances, however, the tubular part upon which the thread was formed was of such a nature that it fitted easily within the conduit and certain other provision was made for locking the conduit in place and preventing the coupling from being backed out. Thus, in some instances the end of the conduit was jammed up against a part corresponding to the flange 2 on the coupling so as to bulge the end portion of the conduit both inwardly and outwardly in an effort to lock it against the separation from the coupling. In other cases clamps were provided for this purpose. It will be appreciated also that with the use of a thread comprising more than one convolution, it was essential that the thread be of the same pitch as the windings of the conduit, so that the coupling could not be used with a conduit having a different pitch from that for which the coupling was made.

In an effort to obviate the disadvantages of the prior art and produce a more economical and more efficient structure I have found that it is possible to use a coupling in which the portion received into the spirally wound conduit has a projection which may or may not consist of a portion of a thread but which does not extend more than one complete convolution of the spiral, and that with such a fitting it is possible to employ conduits of pitch windings which vary considerably from one another. When only a fraction of a convolution is employed as illustrated in Figs. 1 to 4 inclusive, there is, of course, engagement with the groove 8 on only one side of the conduit and consequently the pitch of the groove has little effect on the engagement between this projection 4 and the groove 8.

I have found also that it is possible to provide such a structure which will upon full engagement with a spirally wound flexible conduit of the nature referred to lock itself within such conduit in such a manner that it cannot be removed without special tools. To this end I have discovered that it is necessary that the smaller or extreme end of the reduced tubular portion 3 be made of such an external diameter $a$ that it will readily enter the end of the flexible conduit, but this part should be so tapered that its diameter $b$ at its inner end next to the flange 2 will be slightly greater than the internal diameter of the flexible conduit, this internal diameter being indicated in Fig. 3 by the letter $c$. In other words, the diameter $a$ will be slightly less than the diameter $c$ and the diameter $b$ will be slightly greater than the diameter $c$. The diameter $a$ may be made small enough so that it will fit freely within the smallest of the flexible conduits of one nominal size and the diameter $b$ may be made of such a diameter that it will be slightly greater than the largest diameter $c$ of the various conduits of the same nominal size. In any event, however, the angle $d$ should not be greater than the critical angle for the materials employed in the coupling and conduit respectively and it has been found in actual practice that with the customary steel conduit and with a coupling made of die cast material customarily used for such purposes, an angle of substantially half of the critical angle is proper for the entire included angle between the two opposite side surfaces of the portion 3. That is, the angle $d$ would be approximately one-fourth of the critical angle and in the case of the materials referred to this would be approximately 3° to 5°, and the included angle of the taper 7° to 10°.

Another point to be observed is that the dimension $b$ should not be large enough to stretch the conduit radially sufficiently for the last convolution to be lifted from the next adjacent convolution on that end of the conduit on which the ribbon or strip terminates on the outside.

With the foregoing in mind it will be appreciated that when the coupling is fully engaged within the conduit as illustrated in Fig. 4, the end portion of the conduit designated by the numeral 9 will be slightly expanded and there will be a strong frictional engagement between the last convolution or so of the conduit and the surface of the tapered tubular portion 3 of the coupling.

Now it is to be noted that in inserting the coupling into the conduit it will be rotated in such a direction as will tend to unwind or loosen or expand the convolutions of the conduit. After it has been fully engaged and the end portion of the conduit expanded and caused to frictionally grip the inner end portion of the tubular part 3 on the coupling, then any effort to rotate the coupling in the reverse direction to disengage it from the conduit will tend to wrap the last convolution of the conduit more tightly upon this portion 3 and it will be found that the coupling is firmly locked in position within the conduit.

Figures 5, 6:
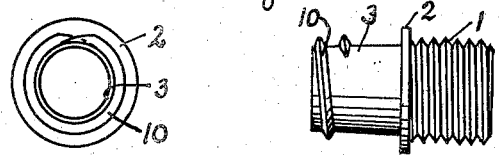
Fig. 5 is a view similar to Fig. 1 but showing a slight modification.
Fig. 6 is a view similar to Fig. 2 but showing the modification illustrated in Fig. 5.

Referring now to Figs. 5 and 6, these figures are included in order to illustrate a coupling having substantially one complete convolution of a thread on the tapered portion 3. This is indicated at 10, and it has been found possible due to the elastic nature of conduits formed in the manner above described and due to the width of the slots 8 in such conduits, to employ a coupling having a thread with one full convolution but not substantially greater than one full convolution, to employ such coupling in conduits of pitches varying substantially from each other. It will be understood therefore that the projection upon the coupling may take the form of as much as one full convolution of a thread thereon without preventing the coupling from being used in connection with conduits of different pitches. In this connection it is to be noted that Fig. 6 clearly shows that the extreme ends of the thread section 10 are more than 360° from each other around the tubular portion 3, but that the full thread does not extend in excess of 360°.

The coupling above described may be easily and without any special tools screwed into the end of a conduit until the flange 2 on the coupling abuts the end of the conduit. Thereupon no further rotation can take place because of the engagement between the fractional or full convolution thread and the groove 8 on the interior of the conduit, taken with the abutment of the end of the conduit against the coupling flange 2. However, the coupling cannot be backed out of the conduit because of the frictional engagement between the last convolution of the conduit and the surface of the tubular portion 3 at the larger end thereof.

A conduit coupling has thus been provided which is extremely simple to manufacture, in which no exact tolerances have to be maintained, and which will perform its function efficiently and may be used without the necessity for any tools to be employed.

Having described my invention, what I claim is:

1. A coupling for a flexible conduit comprising a spirally wound band, said coupling comprising a tapered tubular body having an external projection adjacent the small end thereof, said projection adapted to engage the spiral of said conduit and draw said body into said conduit when said body is inserted into said conduit and turned in a direction tending to expand said spiral, and a part adapted to frictionally engage within said conduit to prevent rotation of said body the body part having the external projection thereon being of less diameter than the body part frictionally engaging said conduit.

2. A coupling for a flexible metallic conduit comprising a spirally wound band, said coupling comprising a tubular body having an external projection in the form of a thread extending only part way around the tabular body adapted to engage the spiral of said conduit and draw said body into said conduit when said body is inserted into said conduit and turned in a direction tending to expand said spiral, and a part adapted to frictionally engage within said conduit to prevent reverse rotation of said body.

3. A coupling adaptable for use in conjunction with a flexible conduit made up of at least one spirally wound band to form an internal spiral groove, said coupling comprising a tubular body one end of which is of a size that it is easily insertable into such a conduit, a projection on said body adjacent said end, said projection extending only a part of the way about the body, and adapted to fit within a spiral groove within such a conduit.

RICHARD L. ACRES.

REFERENCES CITED

The following references are of record in the file of this patent:

UNITED STATES PATENTS

| Number | Name | Date |
| --- | --- | --- |
| 848,819 | Freeman | Apr. 2, 1907 |
| 1,842,216 | Thomas | Jan. 19, 1932 |